United States Patent
Kaneko et al.

(10) Patent No.: US 8,099,514 B2
(45) Date of Patent: Jan. 17, 2012

(54) NETWORK FILE SYSTEM

(75) Inventors: Akihiro Kaneko, Setagaya (JP); Miyuki Katsuki, Itami (JP); Kazuhisa Misono, Yamoto (JP); Takashi Yonezawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 12/138,060

(22) Filed: Jun. 12, 2008

(65) Prior Publication Data

US 2008/0235392 A1    Sep. 25, 2008

(30) Foreign Application Priority Data

Dec. 16, 2005    (JP) .................................. 2005-363359

(51) Int. Cl.
*G06F 15/173*    (2006.01)
*G06F 15/16*    (2006.01)
(52) U.S. Cl. ........ 709/232; 709/229; 709/230; 709/203; 713/168; 713/191; 713/100; 713/181; 713/189; 711/111; 711/4; 711/112; 711/162; 705/51; 705/67; 705/59
(58) Field of Classification Search .................. 709/232, 709/219
See application file for complete search history.

(56) References Cited

U.S. PATENT DOCUMENTS

| | | | |
|---|---|---|---|
| 7,080,194 B1 * | 7/2006 | Van Dyke | 711/105 |
| 2003/0163652 A1 * | 8/2003 | Tsuge | 711/147 |
| 2006/0123142 A1 * | 6/2006 | Duncan et al. | 710/5 |

FOREIGN PATENT DOCUMENTS

| | | |
|---|---|---|
| JP | 10049424 A | 2/1998 |
| JP | 2003/24611 | 9/2003 |
| JP | 2003/330787 A | 11/2003 |
| JP | 2005/252596 A | 9/2005 |

OTHER PUBLICATIONS

Chinese Office Action Summary from application No. 2006800468778 mailed on Jan. 8, 2010.

* cited by examiner

*Primary Examiner* — Jude Jean Gilles
(74) *Attorney, Agent, or Firm* — Zilka-Kotab, PC

(57) ABSTRACT

A method in one embodiment is performed at least in part at a server in a network file system that includes said server and a plurality of clients connected by a network, the method comprising: receiving a data write request from one client; selecting a client as a write object of said data from the other clients according to a condition of said one client stored in advance and/or conditions of said other clients; and transmitting said data write request to the client selected as a write object. Additional systems, methods and computer program products are also presented.

25 Claims, 20 Drawing Sheets

[Figure 1]
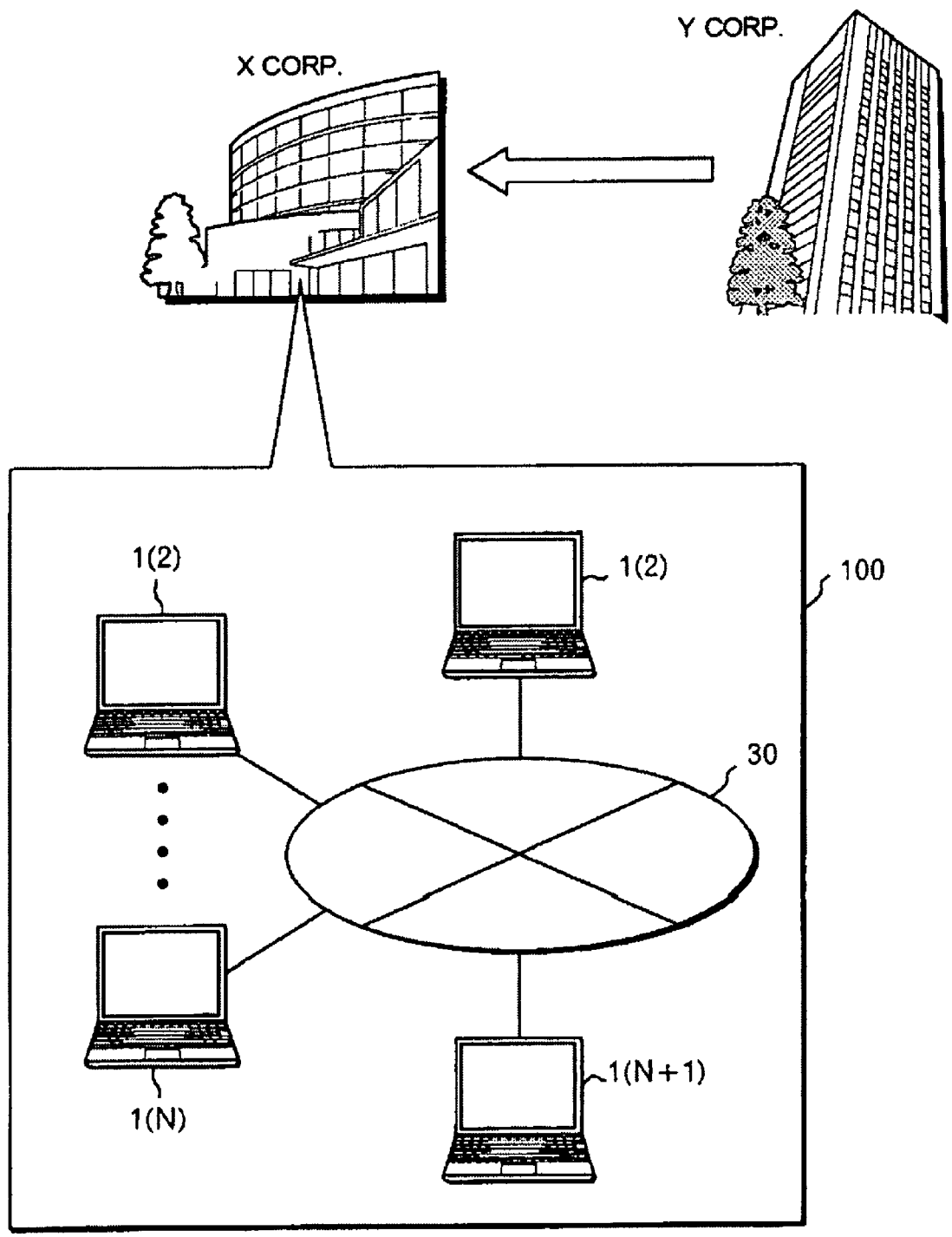

[Figure 2]
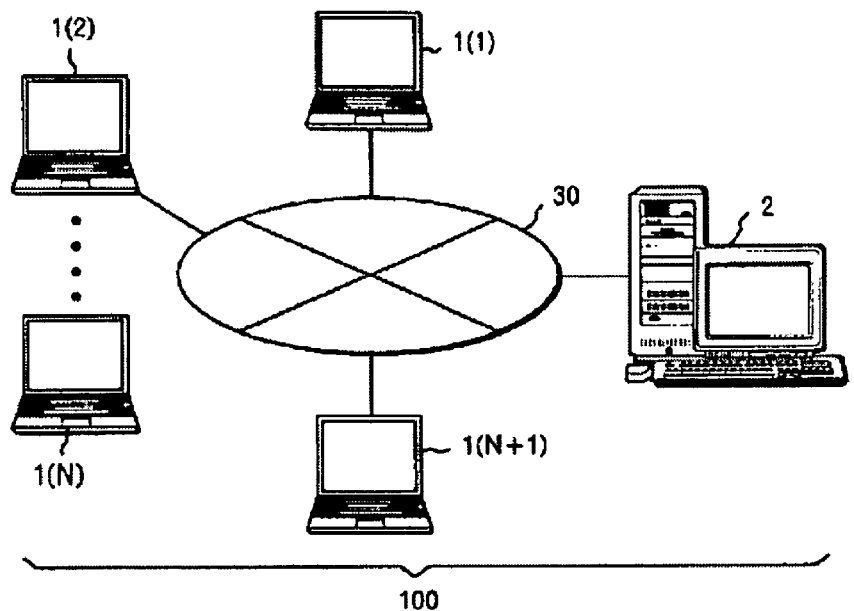
(A)
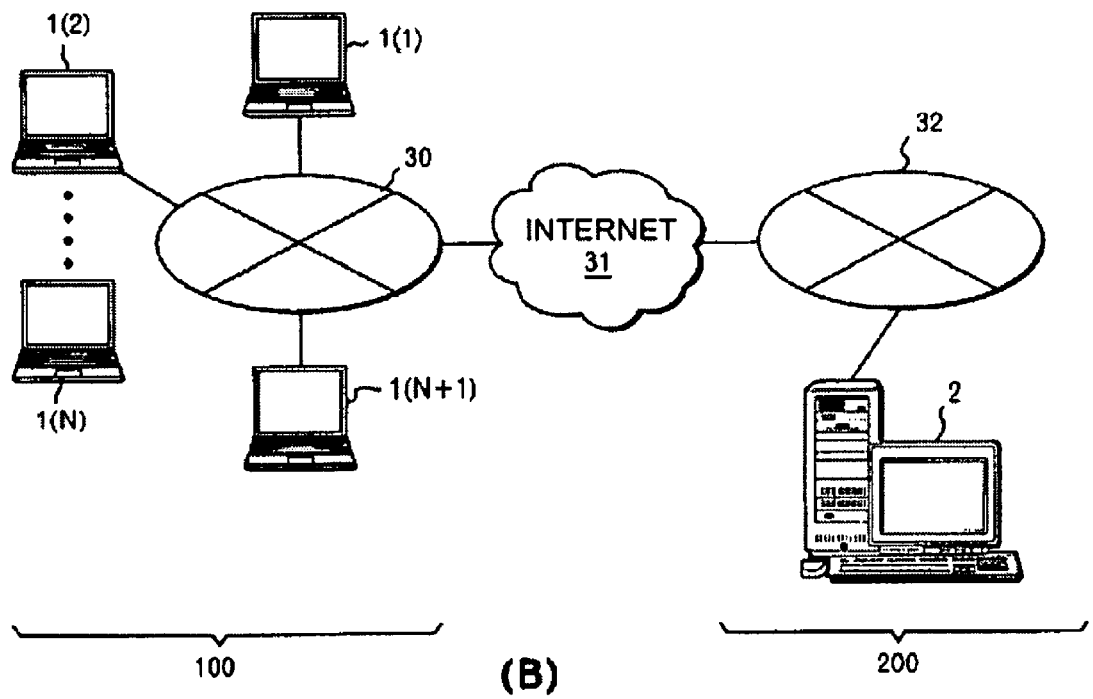
(B)

[Figure 3]
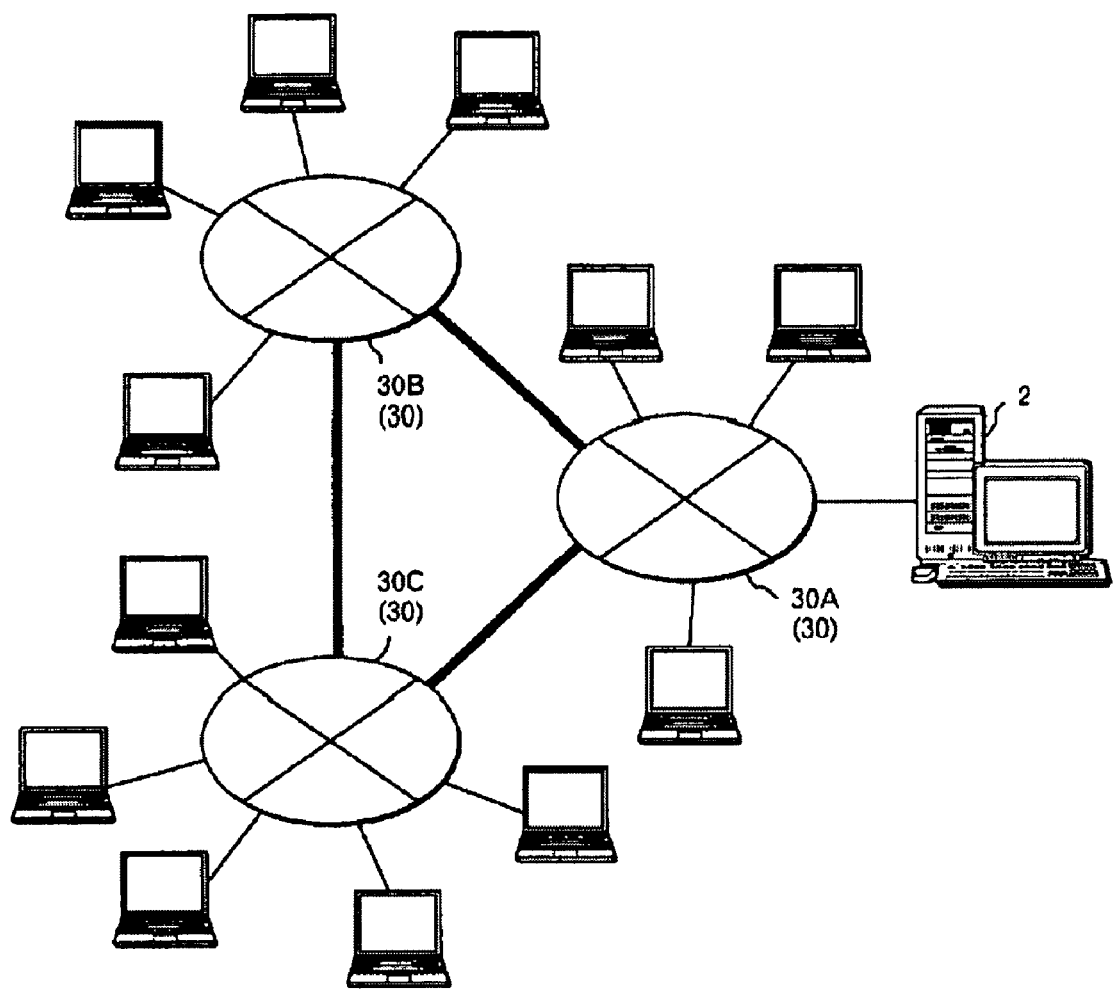

[Figure 4]
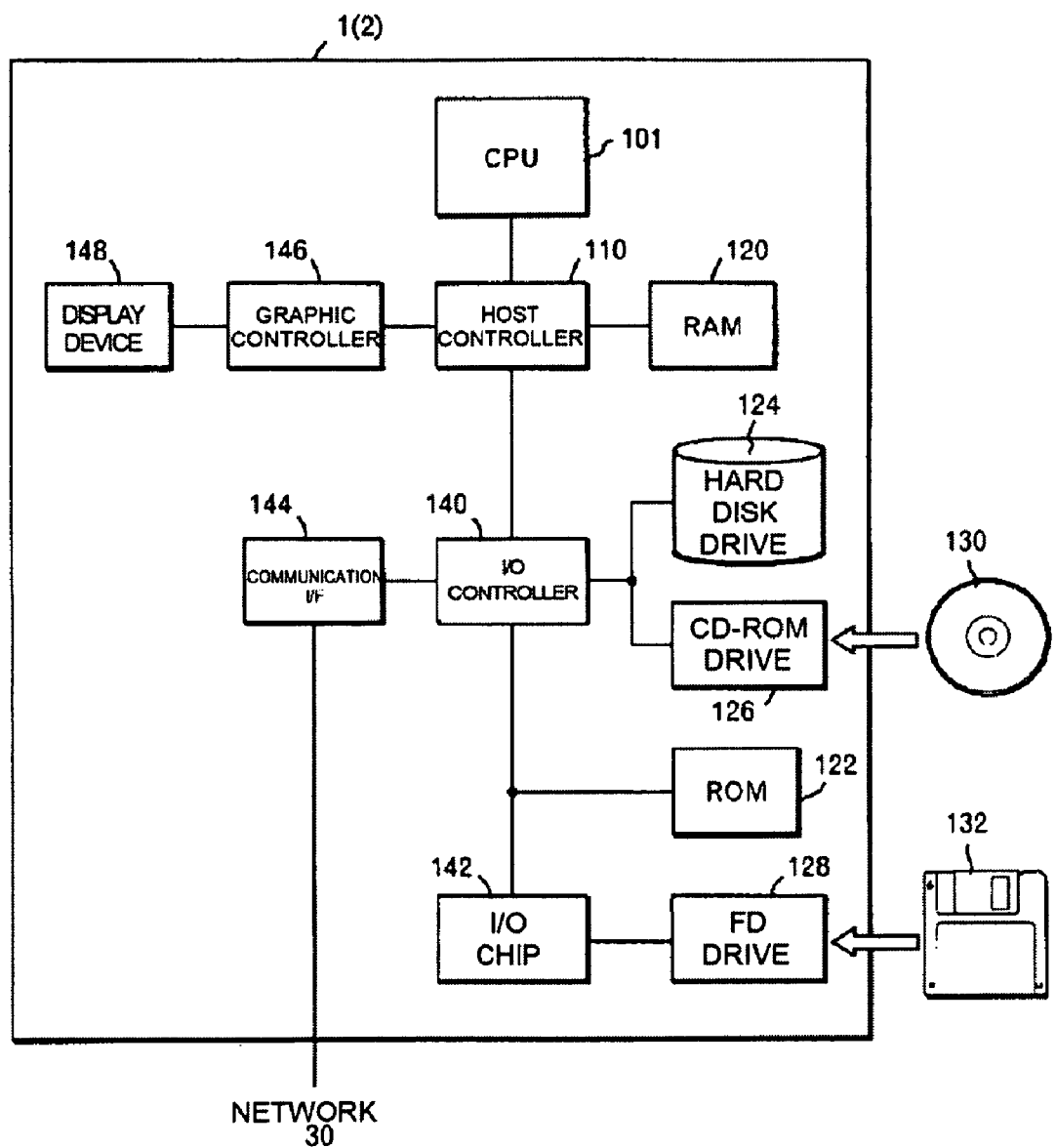

[Figure 5]
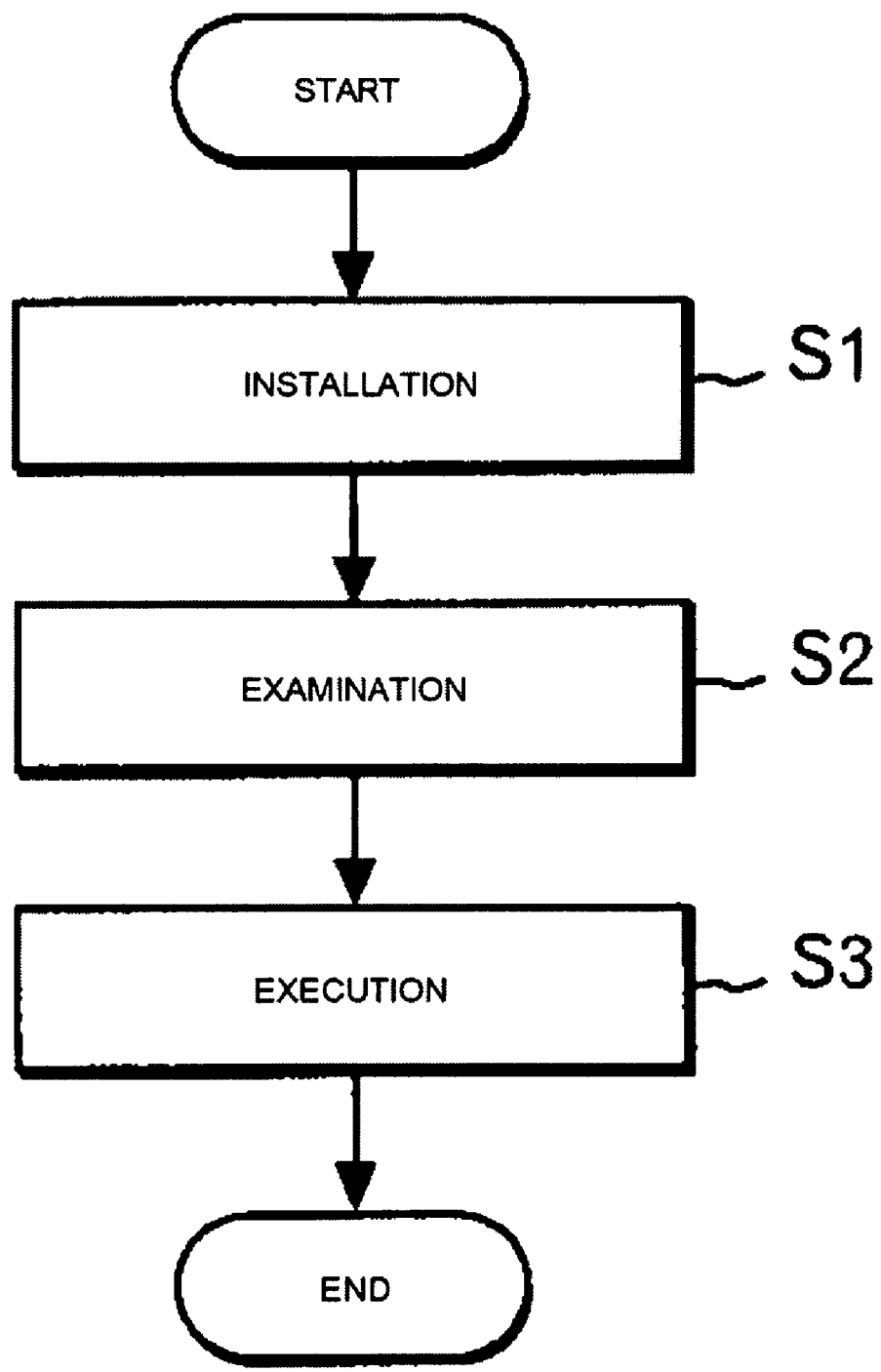

[Figure 6]
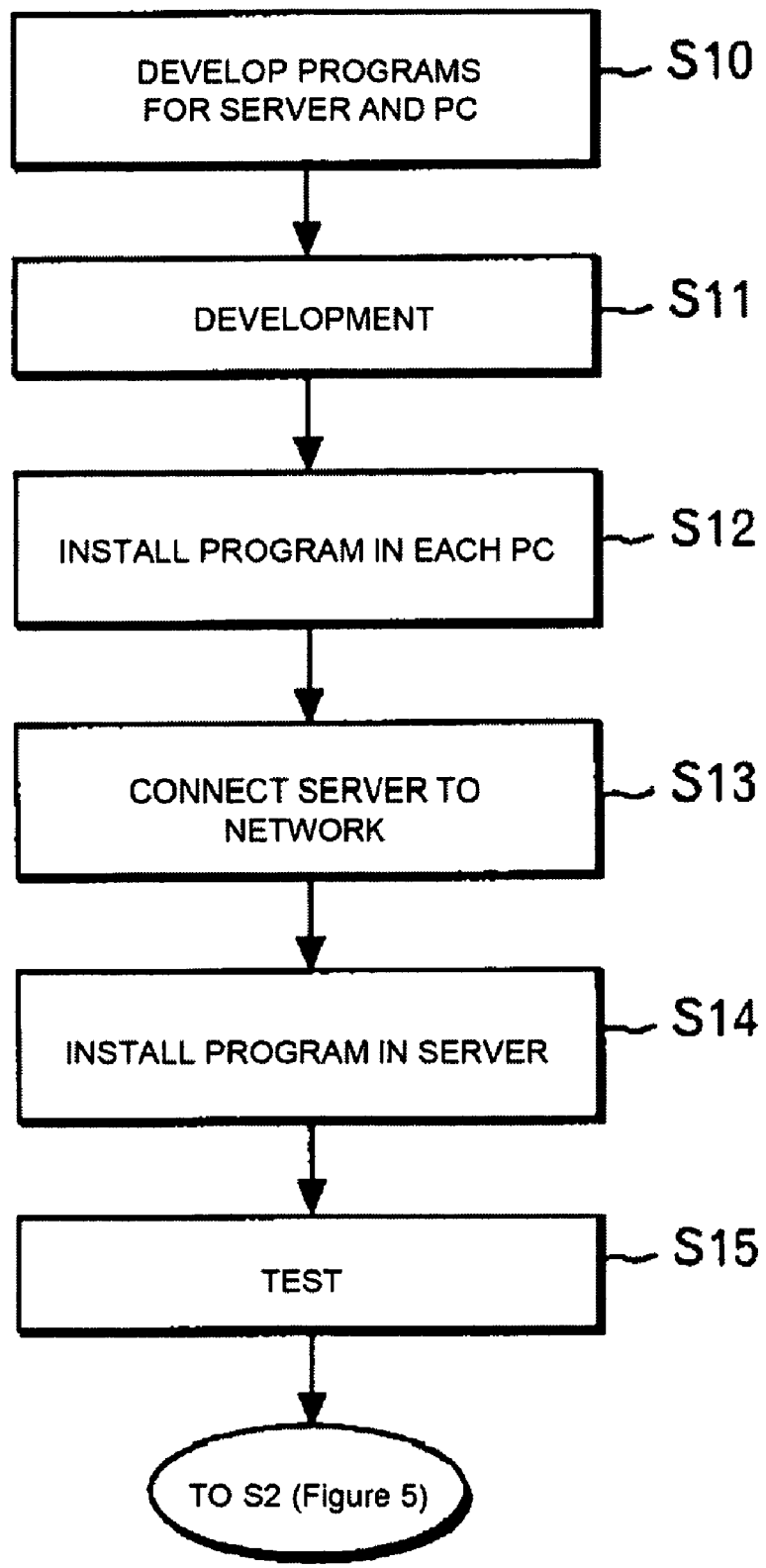

[Figure 7]
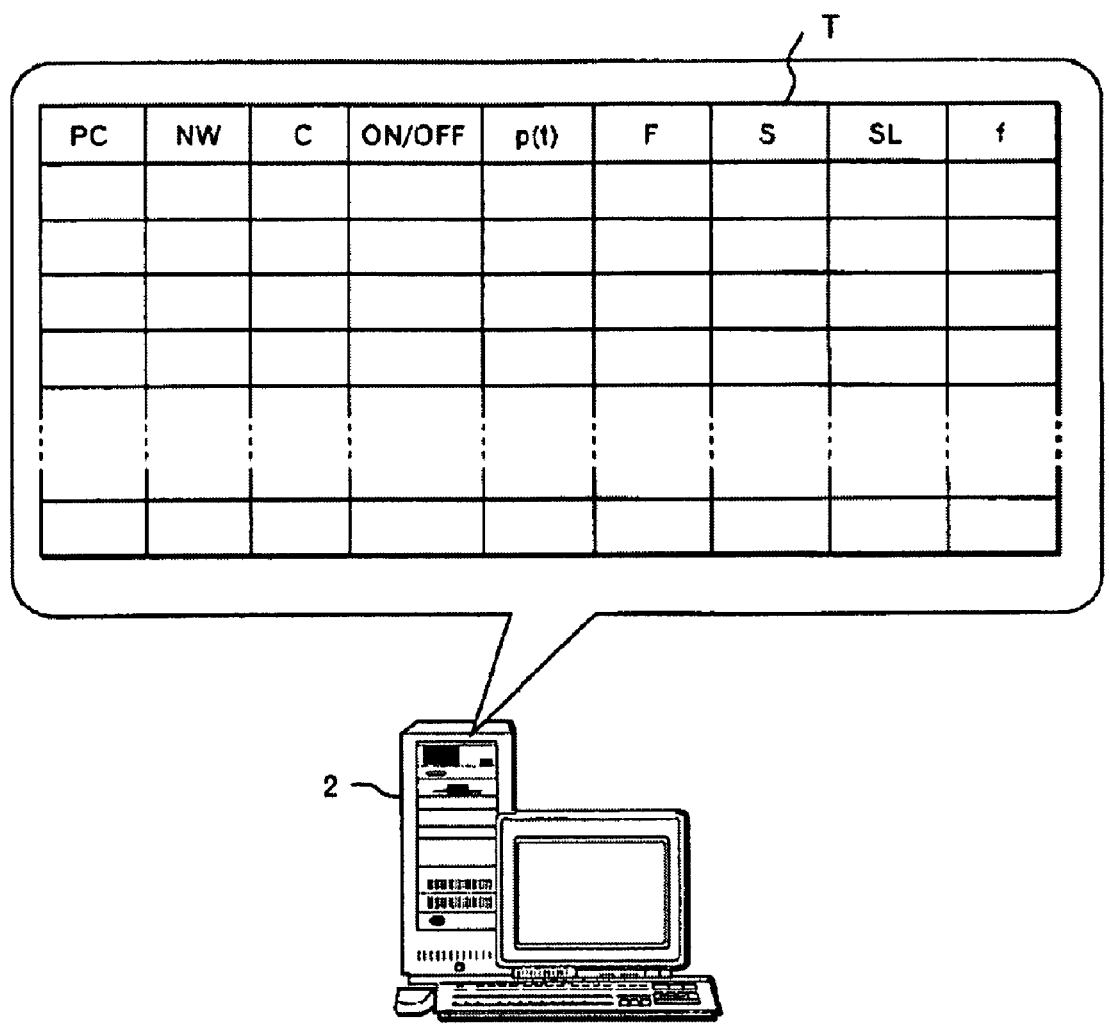

[Figure 8]
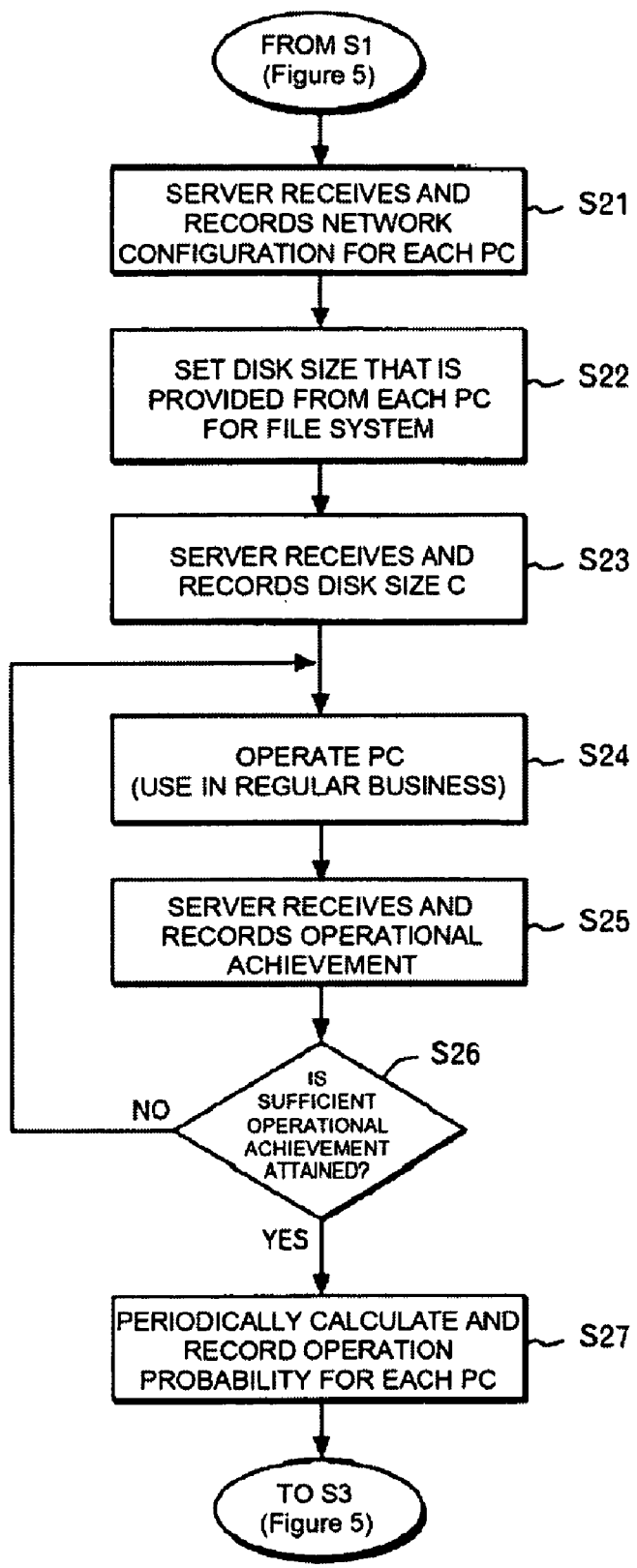

[Figure 9]
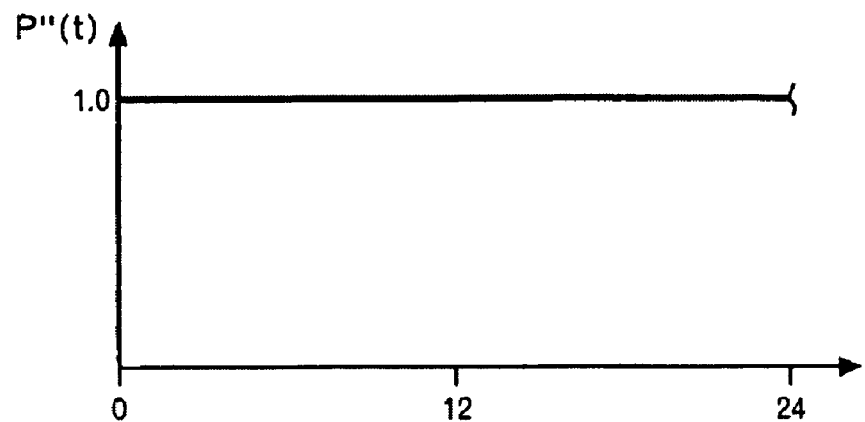
(A)
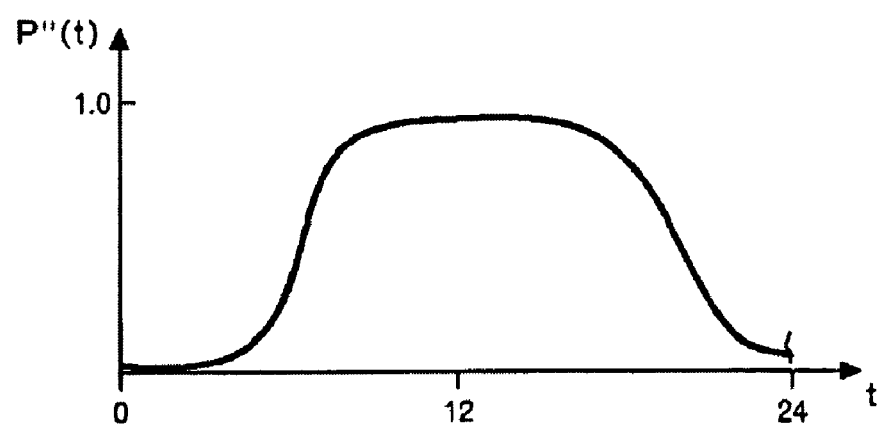
(B)
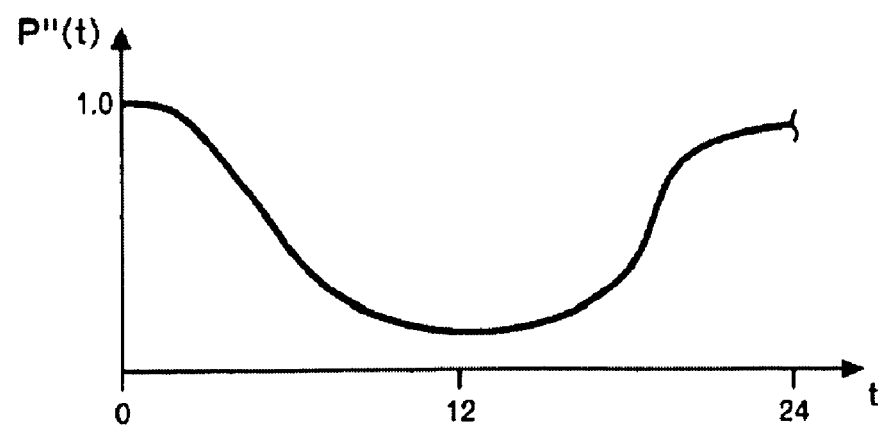
(C)

[Figure 10]
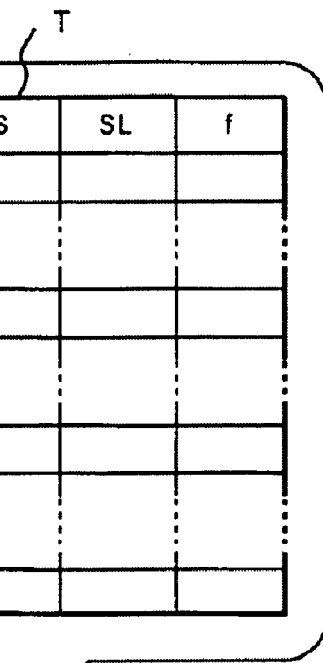
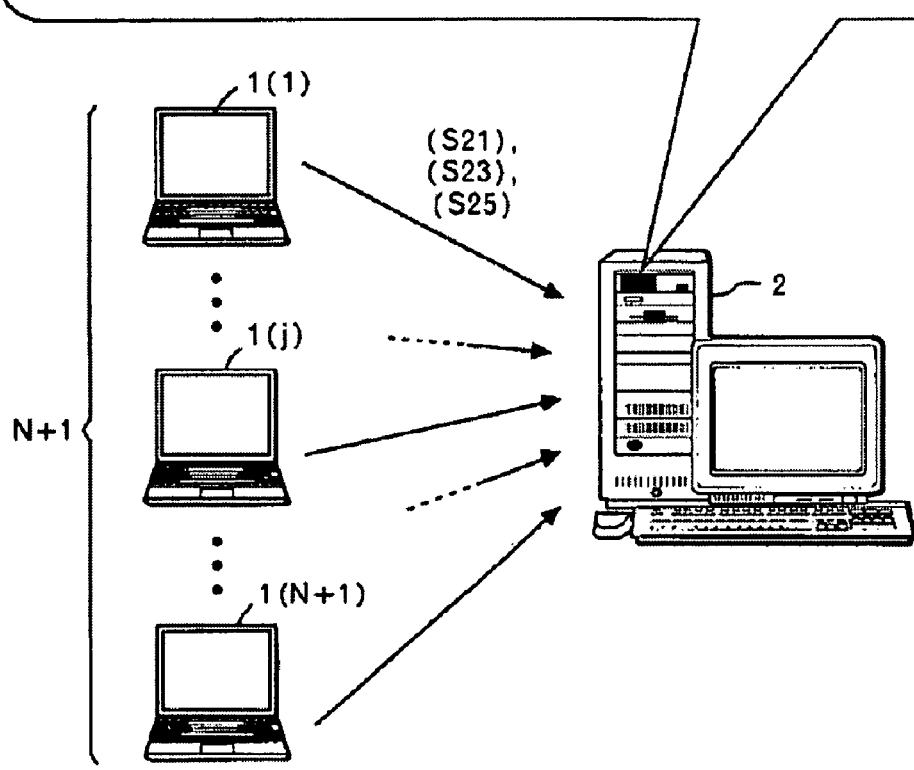

[Figure 11]
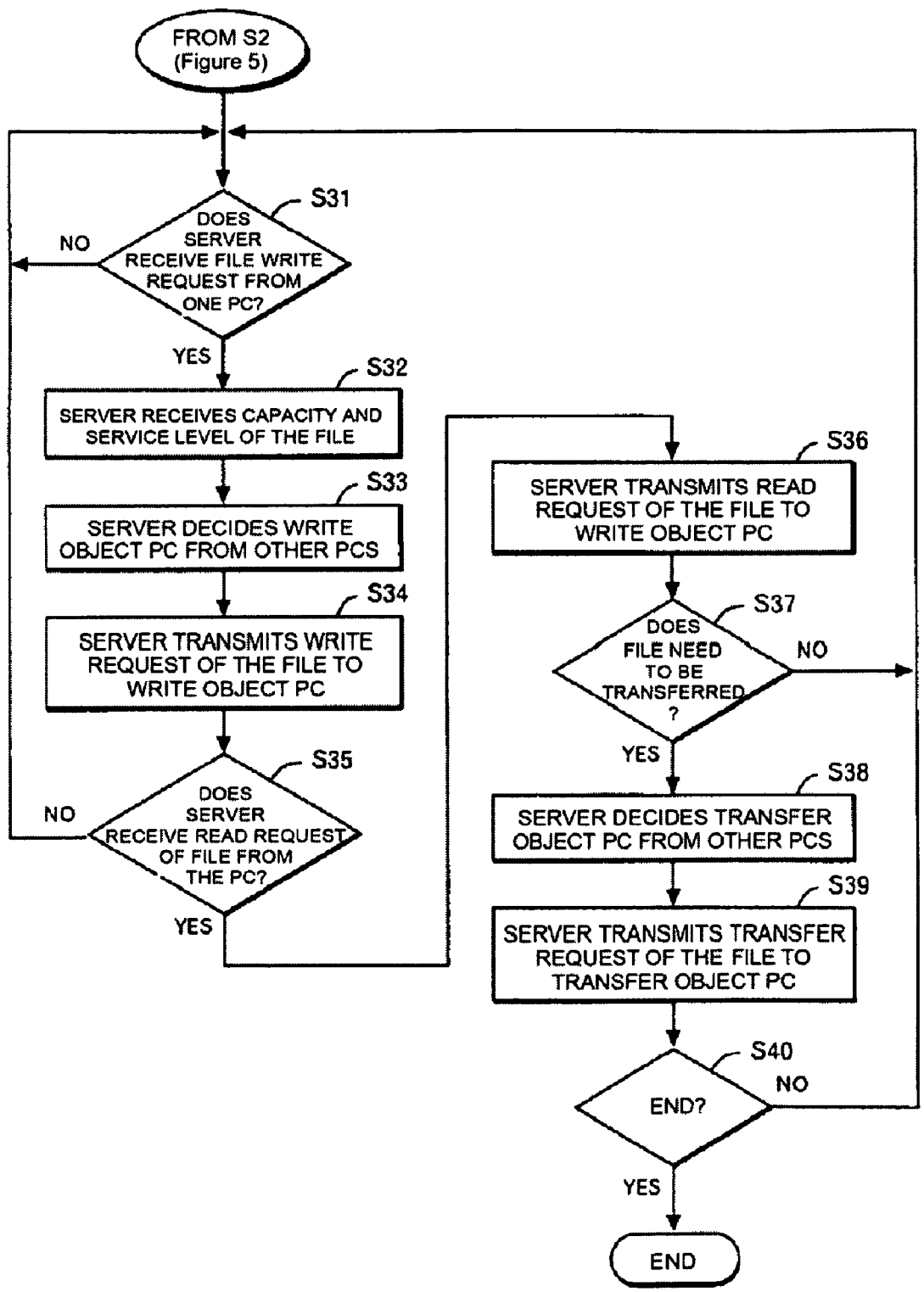

[Figure 12]
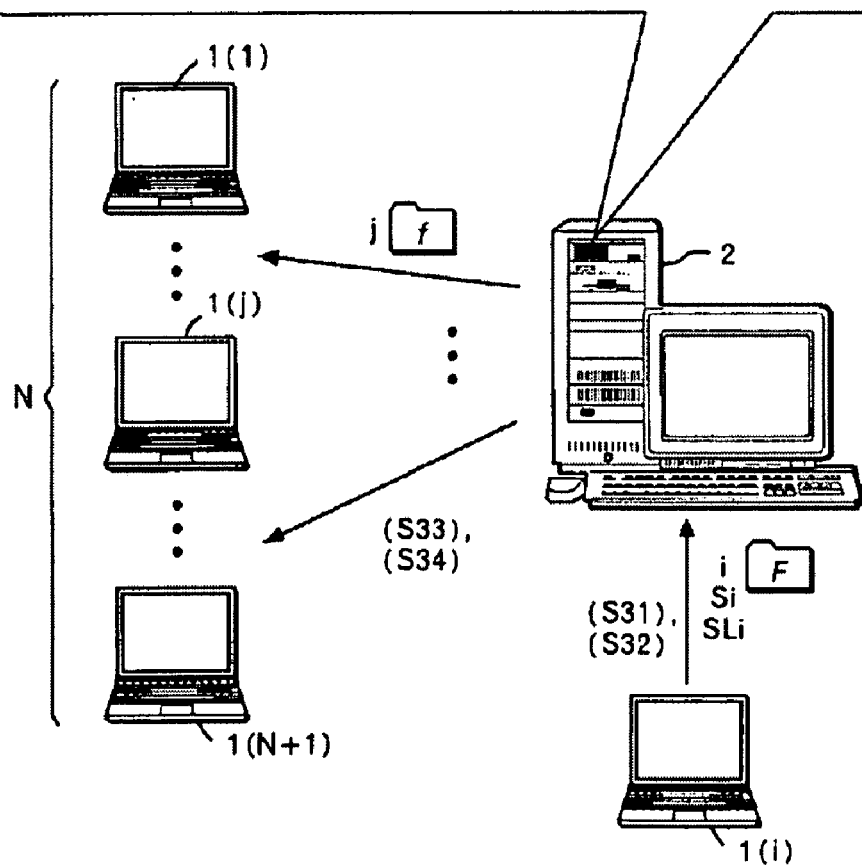

[Figure 13]
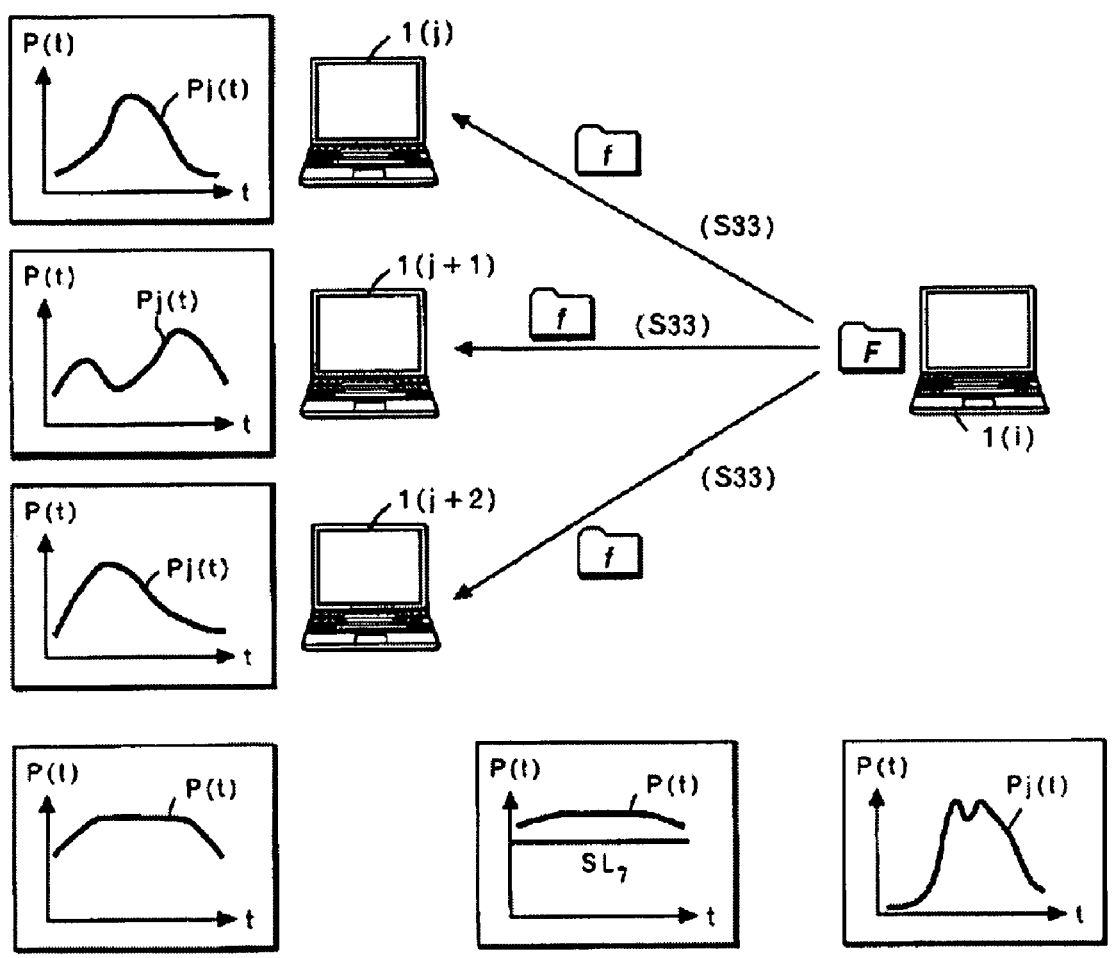

[Figure 14]
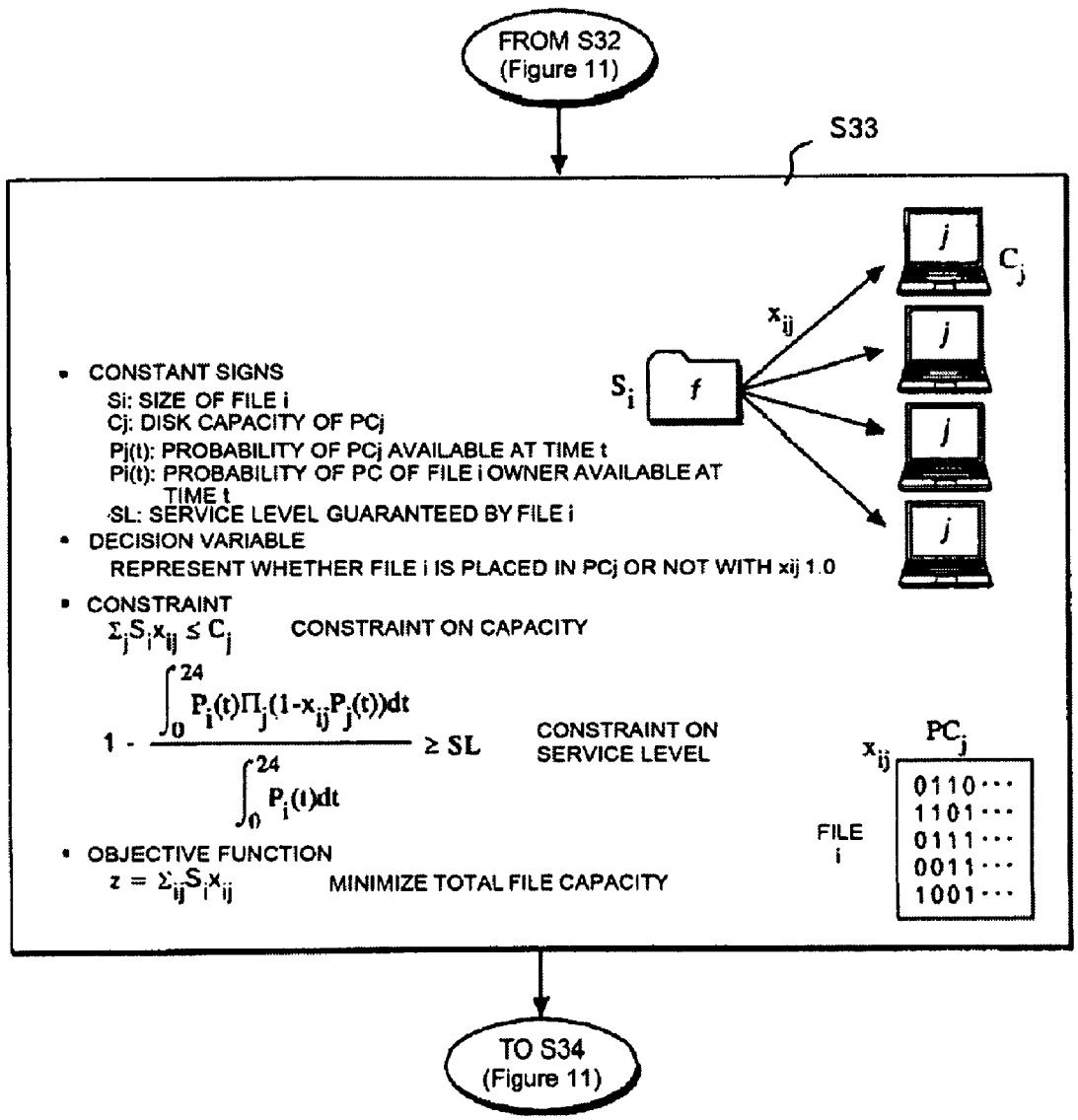

[Figure 15]
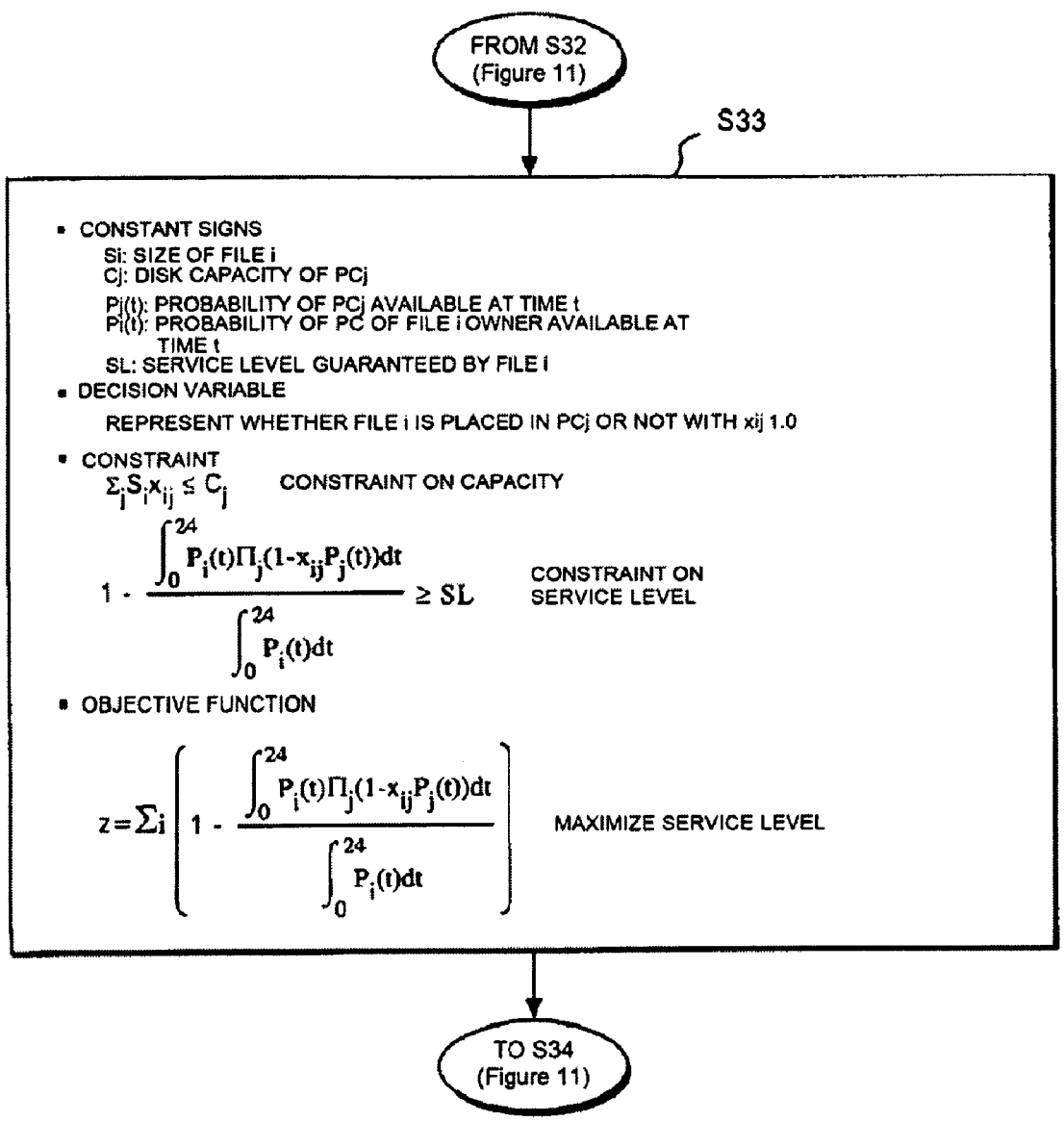

[Figure 16]
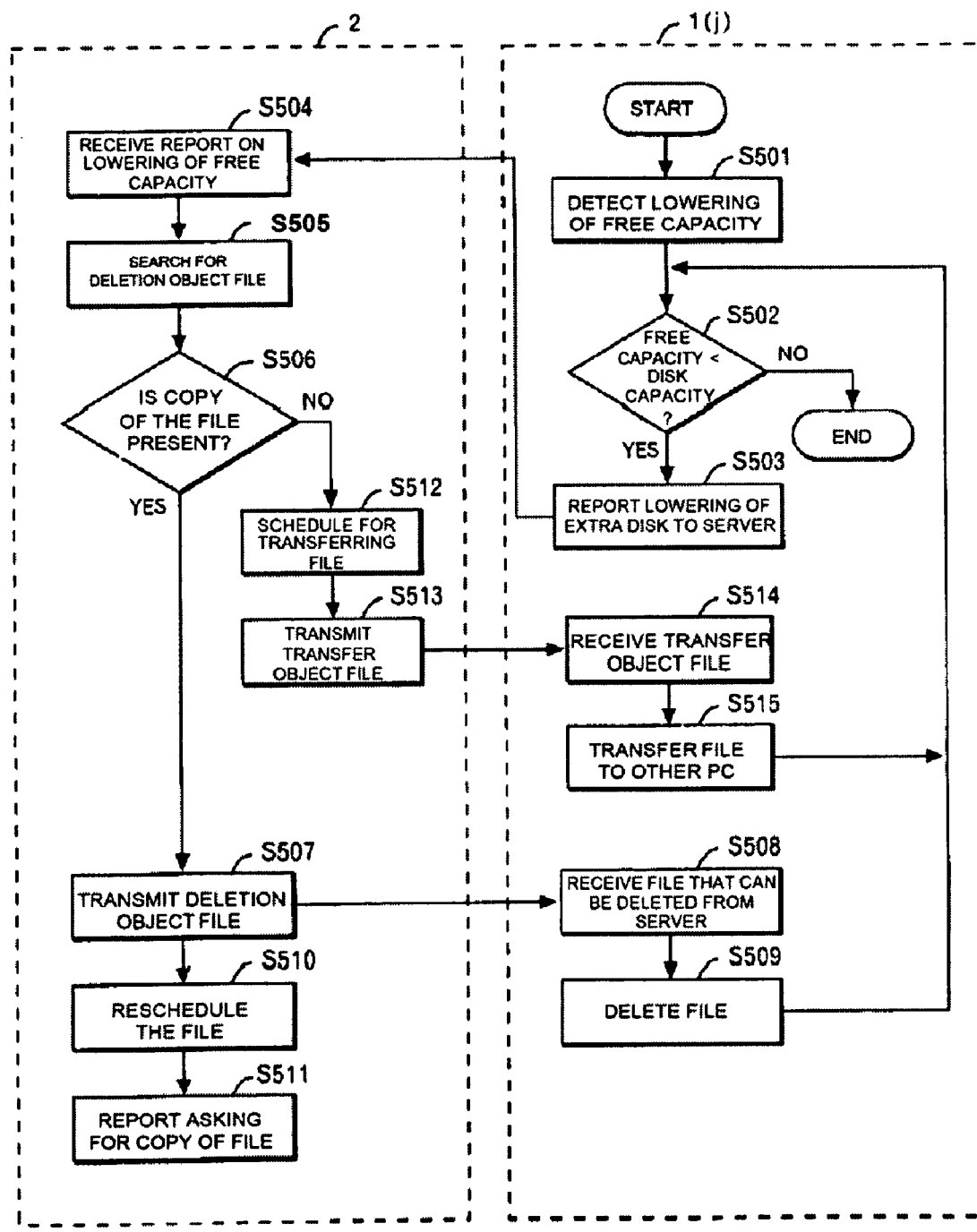

[Figure 17]
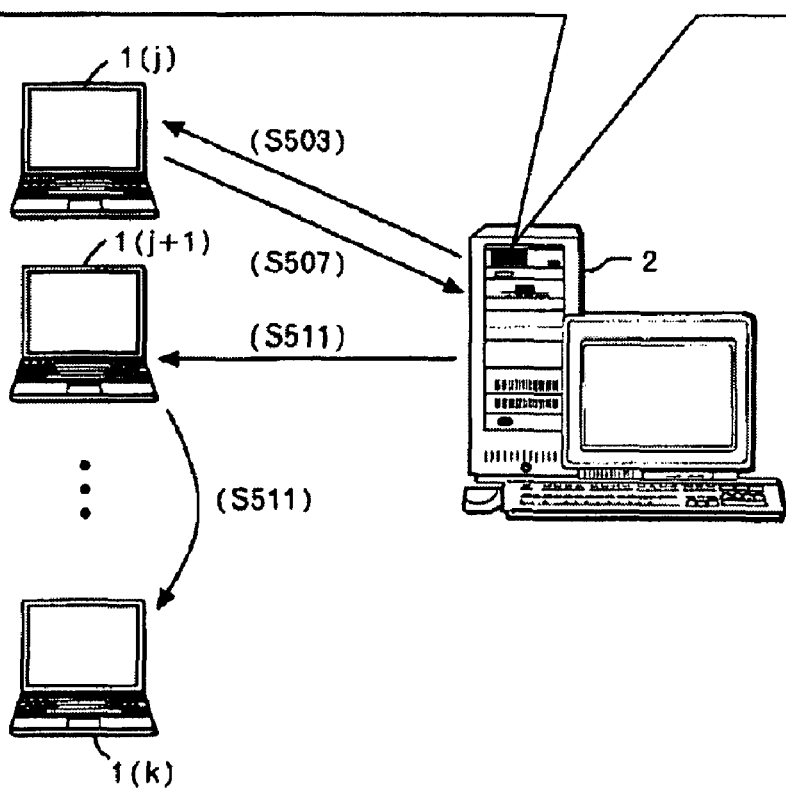

[Figure 18]
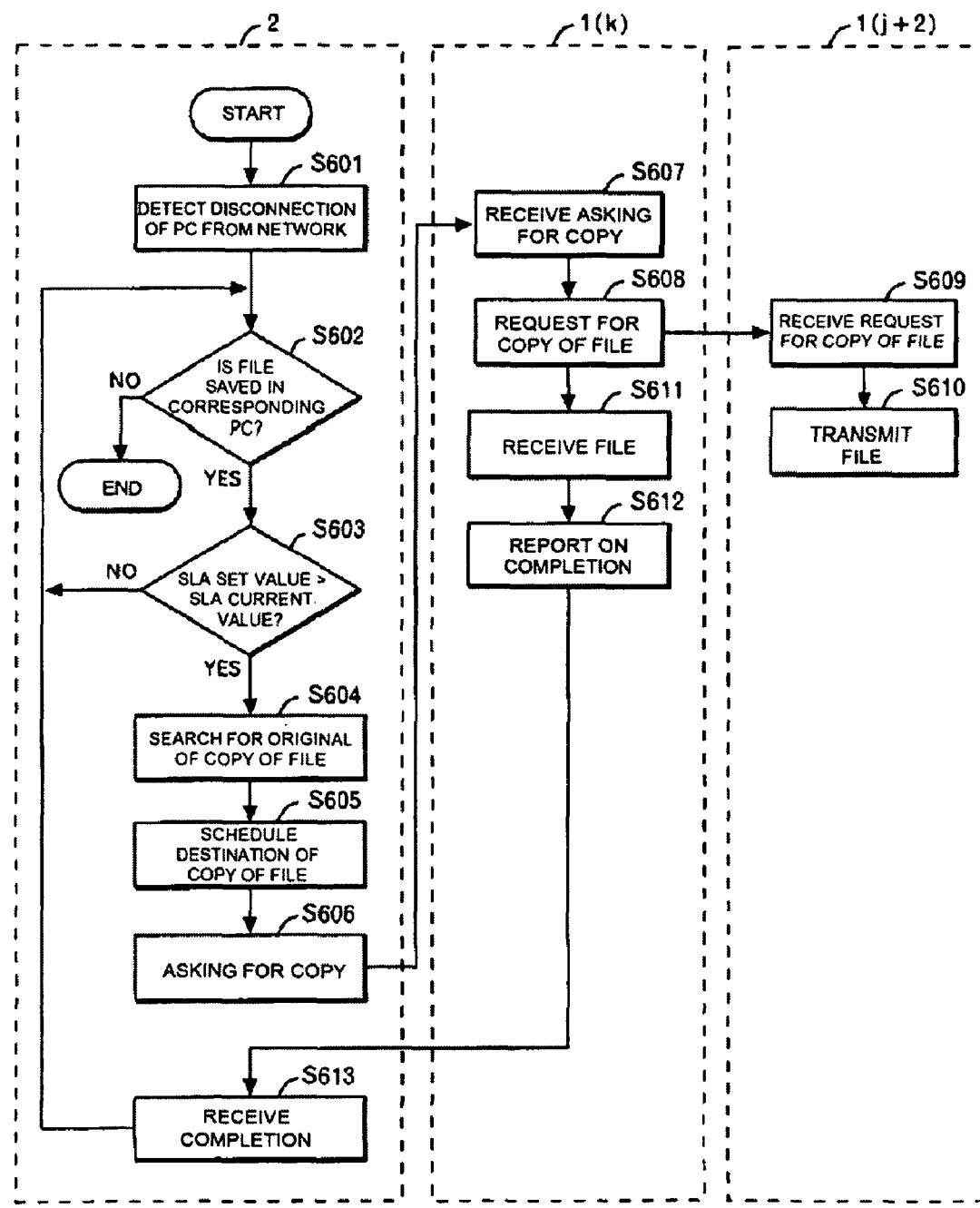

[Figure 19]
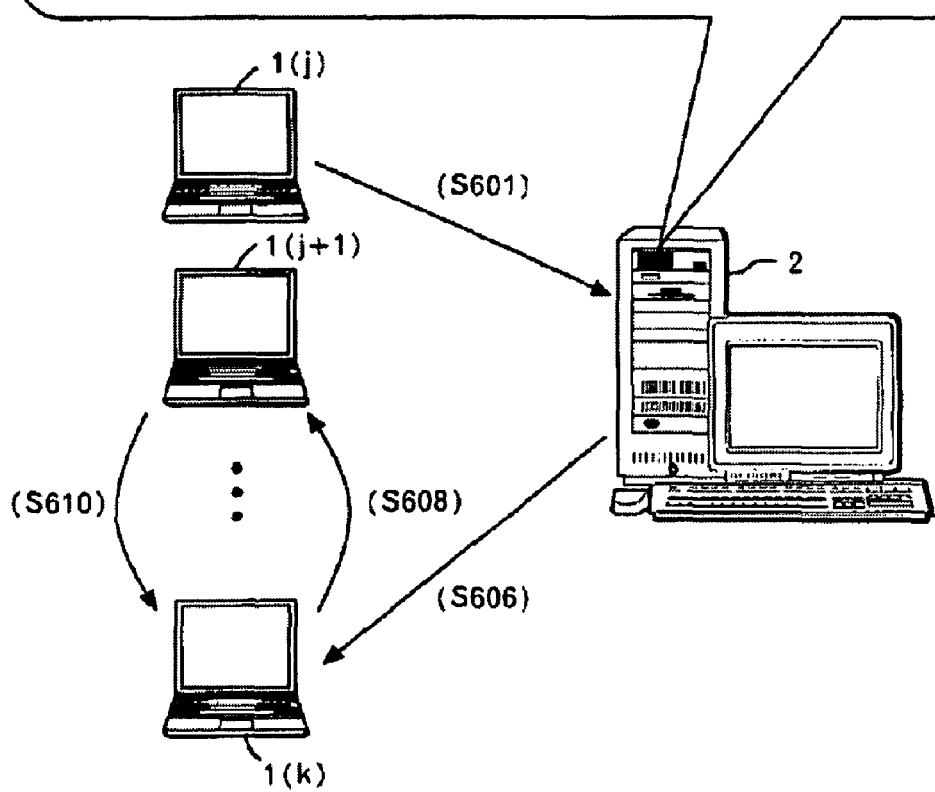

[Figure 20]
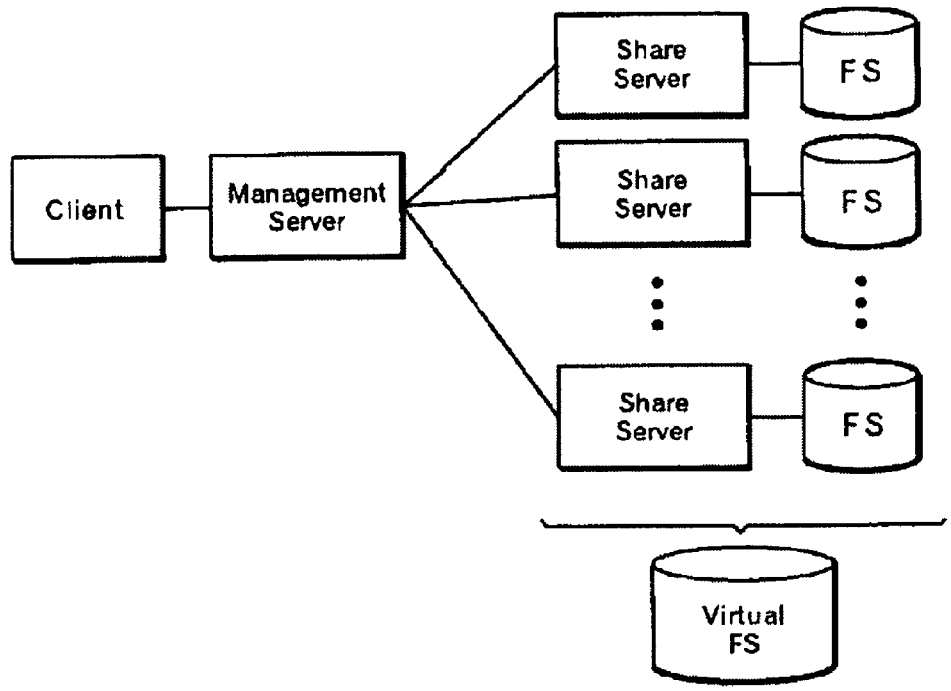
[Figure 21]
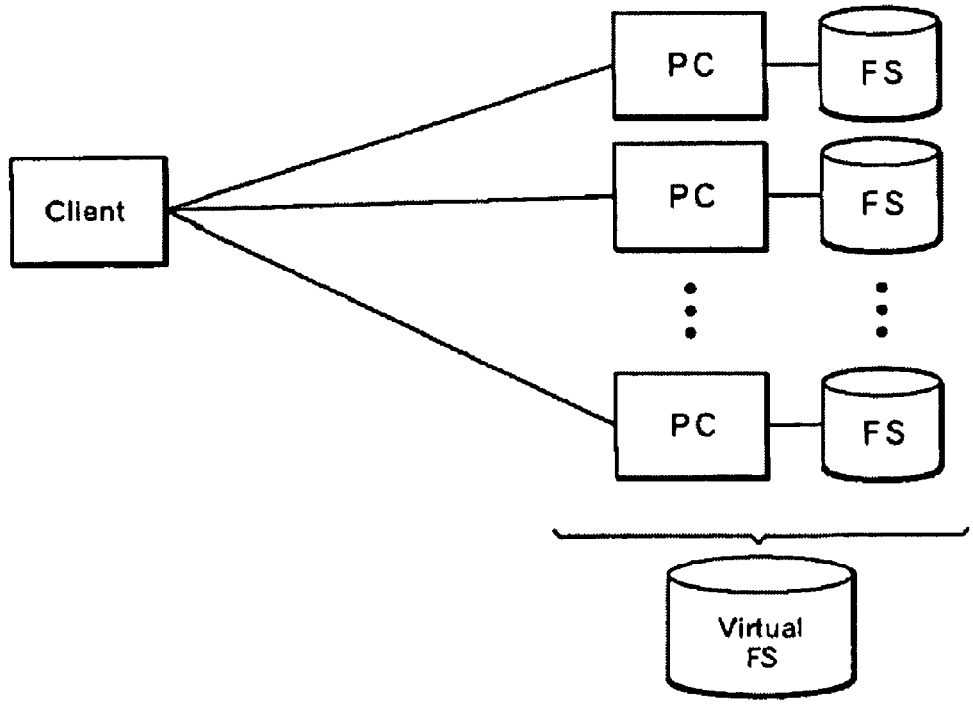

NETWORK FILE SYSTEM

TECHNICAL FIELD

The present invention relates to a technique for making good use of extra storage areas in a terminal on a network, and more specifically to a network file system technology which is effective even if the terminal may not be always operating.

BACKGROUND

Conventional technology used for a file system which utilizes terminals on a network is largely divided into a network file system type and a peer-to-peer type.

FIG. 20 is a conceptual diagram for showing a network file system type file system. In the file system, a plurality of share servers and a management server are connected by a network. Each share server has physical auxiliary storage. When a client requests the file system to provide a service, the management server provides a logical file system for the client from the plurality of units of the auxiliary storage. Basically, it is assumed that each share server is always in an operating mode. As that kind of file system, the NFS (Network File System) and the AFS (Andrew File System) are known. Published Unexamined Japanese Patent Application No. 2003-248611 also discloses that kind of file system.

FIG. 21 is a conceptual diagram for showing a peer-to-peer type file system. This kind of file system has a plurality of computers, which are connected to a network, forming a virtual file system as a whole instead of having an administrative server for controlling the system. Each computer has a partial auxiliary storage. When a client requests the file system to provide a service, a file is transferred from the computers to the client in one-to-one correspondence. Basically, it is assumed that each computer is not always in an operating mode. As that kind of file system, the Gnutella and the Napster are known.

The network file system shown in FIG. 20 assumes a plurality of share servers which are always in an operating system instead of using a personal computer which is switched on and off by a user. The peer-to-peer system shown in FIG. 21 has each personal computer to unilaterally disclose a file stored therein instead of allowing the client to write in the file.

The present invention is adapted in view of the technical problem, and intends to provide a method, a file system, and a program for a server of the file system which can be applied to a file system capable of writing and reading a file with a high availability while assuming a client which may not be always operating.

SUMMARY OF THE INVENTION

A method in one embodiment is performed at least in part at a server in a network file system that includes said server and a plurality of clients connected by a network, the method comprising: receiving a data write request from one client; selecting a client as a write object of said data from the other clients according to a condition of said one client stored in advance and/or conditions of said other clients; and transmitting said data write request to the client selected as a write object.

A server in a network file system that includes the server and a plurality of clients connected by a network is provided in another embodiment. The server comprises a first reception mechanism for receiving a data write request from one of said clients; a first judgment mechanism for selecting a client as a write object of said data from the other clients according to a condition of said one client stored in advance and/or conditions of said other clients; and a first transmission mechanism for transmitting said data write request to the client selected as a write object.

A computer program product causing a computer to function as a server in a network file system that includes the server and a plurality of clients connected by a network is provided in another embodiment. The computer program product comprises a computer usable medium having computer usable program code embodied therewith, the computer usable program code comprising: computer usable program code configured to receive a data write request from one of said clients; computer usable program code configured to select a client as a write object of said data from the other clients according to a condition of said one client stored in advance and/or conditions of said other clients; and computer usable program code configured to transmit said data write request to the client selected as a write object.

A method for using a network system according to yet another embodiment comprises installing a server in said network system, wherein said server comprises: a first reception mechanism for receiving a data write request from one of said clients; a first judgment mechanism for selecting a client as a write object of said data from the other clients according to a condition of said one client stored in advance and/or conditions of said other clients; and a first transmission mechanism for transmitting said data write request to the client selected as a write object.

Additional embodiments include a method for using a file system, a file system, and a program for the file system which are capable of writing and reading a file to/from a client with a high availability while assuming the client which may not be always operating.

BRIEF DESCRIPTION OF THE DRAWINGS

FIG. 1 is a conceptual diagram for illustrating a network system to which one embodiment of the present invention is applied;

FIG. 2 is a diagram for illustrating how a server is connected;

FIG. 3 is a diagram showing a configuration of an intra-network in more detail;

FIG. 4 is a schematic diagram for illustrating a hardware configuration of a server and a PC;

FIG. 5 is a flowchart for illustrating a basic procedure;

FIG. 6 is a flowchart for illustrating the procedure of "(system) installation (S1)" shown in FIG. 5 in more detail;

FIG. 7 is a diagram for schematically illustrating the server after the system has installed (S1);

FIG. 8 is a flowchart for illustrating the procedure of "(system) examination (S2)" shown in FIG. 5 in more detail;

FIG. 9 shows graphs for illustrating aspects of operation probability p(t) of a PC;

FIG. 10 is a diagram for schematically illustrating an in-house network system after the system has examined (S2);

FIG. 11 is a flowchart for illustrating the procedure of "(system) operation (S3)" shown in FIG. 5 in more detail;

FIG. 12 is a diagram for schematically illustrating the in-house network system that is performing a writing operation;

FIG. 13 is a diagram for schematically illustrating a method for selecting the write object PC $1(j)$ that meets the service level;

FIG. 14 is a diagram for illustrating a method for selecting a write object PC $1(j)$ in more detail;

FIG. 15 is a diagram for illustrating a method for selecting the write object PC 1(*j*) in more detail;

FIG. 16 is a flowchart for illustrating an aspect of transferring a copy of a file according to the embodiment A;

FIG. 17 is a conceptual diagram for showing the aspect of transferring a copy of a file according to the embodiment A;

FIG. 18 is a flowchart for illustrating an aspect of transferring a copy of a file according to the embodiment B;

FIG. 19 is a conceptual diagram showing the aspect of transferring a copy of a file according to the embodiment B;

FIG. 20 is a conceptual diagram for showing a network file system type file system; and FIG. 21 is a conceptual diagram for showing a peer-to-peer type file system.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As will be appreciated by one skilled in the art, the present invention may be embodied as a system, method or computer program product. Accordingly, the present invention my take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment, the present invention can be realized as a method which can be applied to a server. One embodiment of the present invention includes a method applied to a server in a network file system including the server and a plurality of clients connected by a network, comprising: a first reception step of receiving a data write request from one client; a first judgment step of selecting a client as a write object of the data from the other clients according to a condition of the one client stored in advance and/or conditions of the other clients; and a first transmission step of transmitting the data write request to the client selected as a write object.

In another embodiment, the present invention can be realized as a server of a network file system. The network file system includes the server and a plurality of clients connected by a network, comprising: a first reception mechanism for receiving a data write request from one of said clients; a first judgment mechanism for selecting a client as a write object of the data from the other clients according to a condition of the one client stored in advance and/or conditions of the other clients; and first transmission mechanism for transmitting the data write request to the client selected as a write object.

Yet another embodiment of the present invention can be realized as a computer program. Accordingly, one embodiment includes a computer program product comprising a computer usable medium having computer usable program code embodied therewith, wherein the program which causes a computer to function as a server in a network file system including the server and a plurality of clients connected by a network. The computer usable program code comprises computer usable program code configured to: receive a data write request from one of said clients; select a client as a write object of the data from the other clients according to a condition of the one client stored in advance and/or conditions of the other clients; and transmit the data write request to the client selected as a write object.

In yet another embodiment, the present invention can be realized as a method for using a network system as a file system. Accordingly, a method in one embodiment uses a network system including a plurality of clients connected by a network as a file system. The method comprises an installing step of installing a server in said network system, wherein said server comprises: a first reception mechanism for receiving a data write request from one of said clients; a first judgment mechanism for selecting a client as a write object of the data from the other clients according to a condition of the one client stored in advance and/or conditions of the other clients; and a first transmission mechanism for transmitting the data write request to the client selected as a write object.

Exemplary embodiments of the present invention will be described with reference to the drawings.

FIG. 1 is a conceptual diagram for illustrating a network system to which embodiments of the present invention may be applied.

Y Corp. is a system integrator (e.g., a business which undertakes overall tasks from analyzing the operation of a customer to designing, building and operating an information system to address problems). X Corp. is a customer of Y Corp. Y Corp. provides the information system (to be described later) for X Corp. An in-house network system of X Corp. (network system) 100 has an intra-network (network) 30 and (N+1) personal computers (a plurality of clients, hereinafter referred to as "PCs") 1(1)-(N+1) which are connected to the network 30. The number of PCs (N+1) may be in the single digits, tens, hundreds or thousands. Each of PCs 1(1)-(N+1) has business software programs such as those for sending/receiving mail, word processing, spreadsheet, presentation and the like installed therein. The PCs are principally used by employees x(1)-(M+1) of X Corp. in their business. Usually, the employees x(1)-(M+1) switch on their PCs 1(1)-(N+1) respectively when they come to work and switch off their PCs 1(1)-(M+1) respectively when they check out. Many of the employees x(1)-(M+1) are in a working pattern of coming to work in the morning and checking out in the evening or in night. The other of the employees x(1)-(M+1), however, are in different working patterns such as working longer than the others, working shorter than the others, and coming to work in the evening or in night and check out in the morning. The employees x(1)-(M+1) and the PCs 1(1)-(N+1) need not be in one-to-one correspondence.

FIG. 2 is a diagram for illustrating how a server 2 is connected. The server 2 is connected to the in-house network system 100. As shown in FIG. 2A, the server 2 may be directly connected to the intra-network 30 (the embodiment). Alternatively, as shown in FIG. 2B, the server 2 may be directly connected to an intra-network (second network) 32 of Y Corp., and the intra-network (first network) 30 of X Corp. may be connected to the intra-network 32 of Y Corp. via an inter-network (interconnection network) 31 so that the server 2 is indirectly connected to the intra-network 30. Although it is not shown, the server 2 may be directly connected to a third party intra-network which is other than those of X Corp. and Y Corp. and the third party intra-network may be connected to the intra-network 30 of X Corp. via the inter-network 31 so that the server 2 may be indirectly connected to the intra-network 30. In such a case where the server 2 is indirectly connected to an in-house network system via an intra-network, a firewall is preferably provided between the intra-network 30 (32) and the inter-network 31 for information security purposes.

FIG. 3 shows a configuration of the intra-network 30 in more detail. The intra-network 30 may be in a form of a single LAN (Local Area Network, a partial network) or, as shown in FIG. 3, a WAN (Wide Area Network, the entire network) including a plurality of LANs 30A, B, and C (the embodiment). Considering the fault resistant feature of the file system, each of the LANs 30A, B, and C is preferably adapted to be resistant to disaster (fire, flood, earthquake, etc.).

FIG. 4 is a schematic diagram for illustrating a hardware configuration of the server 2 and the PC 1. The server 2 and the PC 1 have a CPU periphery including a CPU 101, an RAM 120 and a graphic controller 146 which are connected to each other via a host controller 110; an I/O part including a communication interface 144 which is connected to the host controller 110 via an I/O controller 140, a hard disk drive (auxiliary storage) 124 and a CD-ROM drive 126; and a legacy I/O part (a flexible disk drive 128, etc.) including a ROM 122 and an I/O chip 142 which are connected to the I/O controller 140.

The host controller 110 connects the RAM 120, the CPU 101 which accesses the RAM 120 at a high transfer rate, and the graphic controller 146. The CPU 101 operates according to programs stored in the ROM 122 and the RAM 120 to control over each part. The graphic controller 146 obtains image data which is generated by the CPU 101 or the like on a frame buffer provided in the RAM 120, and displays the image data on a display device 148. The graphic controller 146 may have a frame buffer for storing image data which is generated by the CPU 101 or the like therein, instead.

The I/O controller 140 connects the host controller 110, the communication interface 144 which is a relatively fast I/O device, the hard disk drive 124, and the CD-ROM drive 126. The communication interface 144 communicates with another device via the network. The hard disk drive 124 stores programs and data used by the computer. The CD-ROM drive 126 reads programs and data from the CD-ROM 130 and provides them to the I/O chip 142 via the RAM 120.

To the I/O controller 140, the ROM 122 and a relatively slow I/O device such as the I/O chip 142 (for example, the flexible disk drive 128) are connected. The ROM 122 stores a boot program which is executed by the CPU 101 to boot the computer and programs and the like depending on hardware of the computer. The flexible disk drive 128 reads programs and data from a flexible disk 132 and provides them for the I/O chip 142 via the RAM 120. The I/O chip 142 connects the flexible disk drive 128 as well as various types of I/O device via a parallel port, a serial port, a keyboard port, a mouse port and the like, for example, Although the embodiment has the PC 1 and the server 2 configured the same, they may be computers with different configurations. PCs 1(1)-(N+1) may also be computers with different configurations.

Now, an illustrative software configuration of the server 2 and the PC 1 will be described. The computer programs (an operating system and an application program such as the abovementioned business software program) to be provided for the server 2 and the PC 1 are stored on recording media such as the flexible disk 132, the CD-ROM 130, the DVD-ROM, and an IC card or provided over a network. The program is read out from the recording medium and installed in the server 2 and the PC 1 via the I/O chip 142 or read out from another computer on the network and installed in the server 2 and the PC 1 via the communication interface 144 so as to be executed by the server 2 and the PC 1 respectively.

Although the PC 1 has a single hard disk drive 124 here, it may have a plurality of hard disk drives and/or other data storage mechanisms known in the art. The hard disk drive 124 may have storage capacity of hundreds of GB or more with free storage capacity of tens to hundreds of GBs.

FIG. 5 and those following the figure are flowcharts for illustrating procedures of the embodiment. FIG. 5 is a flowchart for illustrating a basic procedure. FIG. 6 is a flowchart for illustrating the procedure of "(system) installation (S1)" shown in FIG. 5 in more detail. FIG. 8 is a flowchart for illustrating the procedure of "(system) examination (S2)" shown in FIG. 5 in more detail. FIG. 11 is a flowchart for illustrating the procedure of "(system) operation (S3)" shown in FIG. 5 in more detail. The procedures of the embodiment will be described with reference to the flowcharts below.

The installation of the system (S1: installation step) proceeds as below.

Referring for FIG. 6, Y Corp. develops a program for PC (a program for causing a computer to function as a client of the network file system) and a program for server (a program for causing a computer to function as a server of the network file system) (S10 in FIG. 6). The functions of the programs will be apparent in the description on the procedures below. Note that if Y Corp. already has the programs (if Y Corp. has provided a similar service to a company (Z Corp., for example) other than X Corp. before providing the service to X Corp. and all or a part of the program has developed), Y Corp. can omit all or a part of the program development (S10) in preparing the system (S1).

Next, Y Corp. examines the in-house network system 100 of X Corp. and plans installation (S11 in FIG. 6, evaluation step). Y Corp. may examine how each of the employees x(1)-(M+1) of X Corp. uses his/her PC. Then, Y Corp. installs the program for PC in all or some of the PCs of the in-house network system 100 of X Corp. according to the installation plan (S12 in FIG. 6: sub step of installing). In the embodiment, the program for PC is installed in (N+1) PCs 1(1)-(N+1) of the in-house network system 100.

Next, Y Corp. sets the server 2 as a part of the in-house network system 100 of X Corp. (S13 in FIG. 6). The server 2 may or may not have the same configuration as that of the PC 1 (for example, the server 2 may have a plurality of CPUs and hard disk drives for multiplexing usage). The server 2 may be in the possession of either X Corp. or Y Corp. If Y Corp. holds possession of the server 2, Y Corp. may rent the server 2 to X Corp. as a part of the IT service.

Next, Y Corp. installs the program for server (a computer program) in the newly set server 2 (S14 in FIG. 6: sub step of installing). The installation may be performed by either a staff member of Y Corp. or an employee of X Corp. Specifically, the installation may proceed in such a manner as a file including the program for PC is copied in the server 2 in advance and the program for PC is installed in each of the PCs via the intra-network 30. Although it is described as the server 2 is newly set in the embodiment, the program for server may be installed in an existing server in the in-house network system 100 of X Corp. so that the server works as the server 2. When the installation completed, each of the programs is preferably tested for its operation (S15 in FIG. 6).

FIG. 7 is a diagram for schematically illustrating the server 2 after the system has installed (S1). In the server 2, a management table T is generated. The management table T includes an ID field "PC" for identifying each PC 1, a network field "NW" for identifying a LAN to which each PC 1 is connected, a disk capacity field "C" for indicating the disk capacity that is provided by each PC 1 for the network file system, an operation field "ON/OFF" for indicating ON/OFF of the power source state of each PC, and a probability field "P(t)" for indicating operation probability of each PC 1 for each 24 hours. The management table T also includes a file field "F" for identifying a file for which a write request is issued, a file capacity field "S" for indicating the capacity of the file, and a service level field "SL" for indicating the service level that is needed in saving the file. The management table T also includes a copy file field "f" for identifying a PC 1 that stores a copy file of a file for which a write request is issued.

FIG. 8 is a flowchart for illustrating the procedure of "(system) examination (S2): the first examination step" shown in FIG. 5 in more detail. Each PC 1 transmits information for identifying each PC 1 and the network configuration of each PC 1 to the server 2 via the network 30. The server 2 receives the information for identifying each PC and the network configuration of each PC via the network 30 and stores them in the management table T (S 21 in FIG. 8). For example, a PC 1(j) transmits information "j" that identifies itself and information "A" that identifies the connected LAN (LAN 30) to the server 2. The server 2 receives those pieces of information "j" and "A" and stores them in corresponding fields in the management table T respectively. The procedure goes on in the same manner for the other PCs 1.

Next, each employee of X Corp. sets a disk capacity (storage capacity available) that is provided by his/her PC 1 for the file system (S22 in FIG. 8: the second examination step). For example, an employee x(j) of X Corp. sets 50 GB from 100 GB of free capacity in the hard disk drive 124(i) of the PC 1(j) which is mainly used by the employee x(j) for the file system. The other PCs are set in the same manner. The server 2 receives the disk capacity via the network 30 and stores that in the corresponding field "C" in the management table T (S23 in FIG. 8). Although the employees of X Corp. respectively set the disk capacity in the embodiment, an employee of Y Corp. may set the disk capacity or the disk capacity may be set uniformly.

Next, the employees of X Corp. x(1)-(M+1) are allowed to use respective PCs 1(1)-(N+1) in their regular business (S24 in FIG. 8) until a sufficient operational achievement is attained (S26 in FIG. 8). Until that time, the server 2 receives the operational achievement via the network 30 and stores that in the corresponding field "ON/OFF" of the management table T (S25 in FIG. 8). For example, the server 2 transmits an inquiry to each PC 1 at every hour, judges that a PC which responds to the inquiry is switched on and a PC which does not respond to the inquiry is switched off, and stores the respective operational achievements. That step is repeated until a sufficient operational achievement is attained, for example, for one month.

Next, the server 2 periodically calculates the operation probability for each PC 1 and stores that in the corresponding field "p(t)" in the management table T (S27 in FIG. 8). In the embodiment, a week is divided into the weekdays and the weekend and the operation probability at every hour in the weekdays and the operation probability at every hour in the weekend are stored in the field "p(t)" respectively.

FIG. 9 shows graphs for illustrating aspects of the operation probability p(t) of each PC 1. Each graph has an ordinate for indicating the operation probability (during the weekdays) of a PC 1 and an abscissa for indicating time. FIG. 9A shows the operation probability of a PC which is always switched on. The graph on the operation probability p(t) takes a certain value (=1). FIG. 9B shows the operation probability of a PC which is usually switched on during the daytime and switched off during the night. The graph on the operation probability p' (t) produces a convex curve. FIG. 9C shows the operation probability of a PC which is usually switched off during the daytime and switched on during the night. The graph on the operation probability p" (t) produces a concave curve.

FIG. 10 is a diagram for schematically illustrating the in-house network system 100 after the system has examined (S2).

As the system is examined (S2), various types of information are transmitted from respective PCs and accumulated in the management table T of the server 2. Specifically, the ID field "PC" for identifying each of the (N+1) PC 1, the network field "NW" for identifying a LAN to which each PC is connected, the disk capacity field "C" for indicating the disk capacity that is provided by each PC for the network file system, (the operation field "ON/OFF" for indicating ON/OFF of the power source state of each PC), and the probability field "p(t)" for indicating operation probability of each PC for each 24 hours in the management table T of the server 2 have respective values or functions input. For example, "i" is input and stored in the ID field corresponding to PC 1(i), "A" indicating the LAN 30A is input and stored in the network field, "50 GB" is input and stored in the disk capacity field, "ON" indicating that the PC is switched on is input and stored in the operation field, and the probability function "pi(t)" is input and stored in the probability field.

FIG. 11 is a flowchart for illustrating the procedure of "(system) operation (S3): the providing step" shown in FIG. 5 in more detail. FIG. 12 is a diagram for schematically illustrating the in-house network system 100 that is performing a writing operation.

When the server 2 receives a file write request from a PC (a client) 1(i) (S31 in FIG. 11: the first reception step), the writing operation starts and the server 2 further receives the capacity and the service level (data multiplicity and availability standard) of the file from the PC 1(i) (S32 in FIG. 11: the second reception step). Here, the server 2 inputs respective values in the file field "F" for identifying a file for which a write request is issued, the file capacity field "S" for indicating the capacity of the file, and a service level field "SL" for indicating the service level that is needed in saving the file in the management table T. When the server 2 receives a file write request from the PC 1(i), it inputs and stores 'i' in the file field of the management table T, "Si" for indicating the capacity of the file in the file capacity field, and "SLi" in the service level field respectively according to the information transmitted from the PC 1(i). The file write request may be explicitly issued by an employee x(i) of X Corp. who is a user of the PC 1(i) or may be automatically transmitted from the PC 1(i) by certain time period. The service level indicates the probability that ensures execution of the file read request. Here, the service level SLi may be specified by the employee x(i) of X Corp. who is a user of the PC 1(i) for each file or for each user or may be previously set.

Next, the server 2 decides a write object PC 1(j) from the other PCs (1)-(N+1), i.e., N PCs 1 which are (N+1) PCs 1 subtracted by one PC 1(i) (S33 in FIG. 11: the first judgment step).

FIG. 13 is a diagram for schematically illustrating a method for selecting the write object PC 1(j) that meets the service level.

It is assumed that three PCs 1(j)-(j+2) have the operation probability pj(t), pj+1(t), pj+2(t), respectively. The graph on the operation probability is shaped variously according to the operational achievements of PCs 1(j)-(j+2) (records of switching on and off of PCs 1(j)-(j+2), i.e., time records of employees x(j)-(j+2) of X Corp. who use the PCs 1(j)-(j+2)). Now, the probability p(t), which is the probability of the case where at least one of the PCs 1(j)-(j+2) is in operation, is calculated. The probability p(t) is higher than the probability of the case where each of pi(t), pi+1(t), pi+2(t) is solely operating at any time. The operation probability of PC 1(i) which transmits a write request is pi(t). Now, the probability P, which is the probability of the case where PC 1(i) is in operation and at least one of the PCs 1(j)-(j+2) is in operation, is calculated based on the operation probability p(t), which is the probability of the case where at least one of the PCs 1(j)-(j+2) is in operation, and the probability pi(t), which is the probability of the case where the PC 1(i) which transmits the write request is in operation. The probability P is higher than the previously set SLi at any time. That is, if the PC 1(i) writes a copy of the file into a plurality of (here three) PCs 1(j)-(j+2), the copy of the file can be read out with the probability P which is higher than SLi later. A method for selecting the write object PC 1(j) has been conceptually described. Although the operation probability is considered for both of the PC 1(i) and the write object PC 1(j) in the embodiment, the write object PC 1(j) may be decided in consideration of either of them.

FIG. 14 and FIG. 15 are diagrams for illustrating a method for selecting the write object PC 1(j) in more detail. In the embodiment, the write object PC 1(j) is selected according to the optimal arrangement. Embodiments of the optimal arrangement include; first, a method for minimizing the total file capacity of each PC to be written under the condition that meets a given service level SL (embodiment 1: the first mode); second, a method for maximizing the service level under the condition that the total file capacity of each PC to be written is less than the total disk capacity which is provided by each PC to the file system (embodiment 2: the second mode); and a method which is placed between the embodiment 1 and the embodiment 2 (embodiment 3: the third mode). FIG. 14 is a diagram for illustrating a method for selecting the write object PC 1(j) according to the first embodiment. FIG. 15 is a diagram for illustrating a method for selecting the write object PC 1(j) according to the second embodiment. As shown, a decision variable for minimizing an objective function is calculated with defined constant signs and a decision variable as xij (m×n matrix) under the constraint (constraint on capacity and service level).

Then, the server 2 transmits the write request of the file to the write object PC 1(j) (S34 in FIG. 11, the first transmission step). In response, a copy of the file is transmitted from the PC 1(i), which transmitted the write request, to the write object PC 1(j) (multiple in many cases according to the service level set) and stored therein. The copy of the file may be transmitted from the PC 1(i) to PC 1(j) via the server 2 or may be directly transmitted from the PC 1(i) to the PC 1(j). When the server 2 receives the file copy read request from PC 1(i) (S35 in FIG. 11), it refers to the management table T and transmits a request to read a copy of the file to the PC 1(j) to the PC 1(i) in which the copy of the file is written (S36 in FIG. 11). In response, the PC 1(j) which received the read request transmits the stored copy of the file to the PC 1(i). After transmitting the copy of the file to the PC 1(i), the PC 1(j) may delete the copy of the file from its hard disk drive 124 or may keep it as it is.

If a plurality of PCs(j) are switched on when the read request is issued, any of the PCs(j) may transmit the copy of the file or the PC 1(j) which is under less network load may transmit the copy of the file. If three PCs 1(j)-(j+2) store the copy of the file, are switched on when the read request is issued, are connected to LANs 30A, 30B, and 30C respectively, and the PC 1(i) is connected to the LAN 30A, the server 2 selects the PC 1(j) or PC 1(j+1) before the PC 1(j+2) to cause it to transmit the copy of the file to the PC 1(i). If no PC 1(j) is switched on when the read request is issued, the server 2 transmits a message telling that the read request cannot be executed to the PC 1(i).

If the copy of the file which has been written in the PC 1(j) needs to be transferred (S37 in FIG. 11), the server 2 decides the transfer object PC 1(k) from the other PC1s (S38 in FIG. 11: the second judgment step) and transmits a transfer request to the transfer object PC 1(k) (S39 in FIG. 11: the second transmission step). More specific aspects of the transferring of the copy of the file will be described by way of example as the embodiment A and the embodiment B.

Embodiment A

FIG. 16 is a flowchart for illustrating an aspect of transferring a copy of a file according to the embodiment A. FIG. 17 is a conceptual diagram for showing the aspect of transferring a copy of a file according to the embodiment A.

When the write object PC 1(j) detects lowering of the free capacity of the hard disk capacity of itself 124(j) (S501 in FIG. 16), it compares the free capacity and the disk capacity (the capacity set for the file system) (S502 in FIG. 16), and if the free capacity is less than the disk capacity, it reports as such to the server 2 (S503 in FIG. 16).

The server 2 receives the report telling that the free capacity is lowered from the PC 1(j) (S504 in FIG. 16: monitoring step), searches the management table T for the copy of the file which is written in the PC 1(j) (S505 in FIG. 16), and judges whether the copy of the file is present in a PC (for example, PC 1(j+1) or PC 1(j+2)) other than the PC 1(j) (S506 in FIG. 16) If the copy of the file is present (S506 in FIG. 16), the server 2 transmits an order to delete the copy of the file to the PC 1(j) (S507 in FIG. 16), decides the PC 1(k) which is the destination of transferring of the file (S510 in FIG. 16), and transmits a request to write the copy of the file from the PC (for example, PC 1(j+1) or PC 1(j+2)) other than the PC 1(j) to the PC 1(k) (S511 in FIG. 16). The PC 1(i) which received the order to delete the file (S508 in FIG. 16) deletes the copy of the file from the hard disk drive 124(j) (S509 in FIG. 16) and proceeds to the judgment at 3502. If the file is present in a plurality of PCs 1 other than the PC 1(j), the file is preferably transmitted from a PC 1 which is connected to the same LAN as that of the PC 1(k) which is the destination of transfer for the purpose of reducing the network load. If the PC 1(k) and the PC 1(j+2) are connected to the same partial network LAN 30B but the PC 1(j+1) is connected to a different partial network LAN 30A as shown in FIG. 17, the PC 1(j+2) is preferably put before the PC 1(j+1) in transmitting the copy of the file to the PC 1(k).

If the copy of the file is not present in a PC other than the PC 1(j) (the file is stored only in the PC 1(j)) (S506 in FIG. 16), the server 2 decides the PC 1(k) which is the destination of transferring of the copy of the file (3512 in FIG. 16) and transmits a request to write the copy of the file into the PC 1(k) to the PC 1(j) (S513 in FIG. 16). In response, the PC 1(j) which received an order to write the copy of the file transmits a request to write the copy of the file to the PC 1(k) and proceeds to the judgment at S502.

Embodiment B

FIG. 18 is a flowchart for illustrating an aspect of transferring a copy of a file according to the embodiment B. FIG. 19 is a conceptual diagram showing the aspect of transferring a copy of a file according to the embodiment B.

When the server 2 detects disconnection of the intra-network 30 (S601 in FIG. 18: monitoring step), it judges whether the copy of the file is saved in a PC which became incapable of communication due to the disconnection (for example, the PC 1(j) or the PC 1(j+1)) (S602 in FIG. 18), and if a copy of the file is not saved there, it ends the operation; and if a copy of the file is saved there, it compares a previously set service level and the current service level (which is lowered due to the disconnection) (S603 in FIG. 18). The server 2 may judge the disconnection of the intra-network 30 according to a malfunction signal that is received from a network device (a router or the like) which comprises the intra-network 30 or according to whether a PC 1 which is connected to a partial network responded thereto or not. If the current service level meets the set value according to the result of the comparison, the operation proceeds to the step of S602; and if the current service level does not meet the set value, the server 2 searches the management table T for the file that was written in the PC which became incapable of communication (S604 in FIG. 18), decides the PC 1(k) which is the destination of transferring of the file (S605 in FIG. 18), and transmits the write request to the PC 1(k) (S606 in FIG. 18).

The PC 1(k), which received the write request (S607 in FIG. 18), requests a PC, which saves a copy of the file and is capable of communication (for example, PC 1(j+2)), to transmit the file (S608 in FIG. 18). The PC 1(j+2) receives the request (S609 in FIG. 18) and transmits the file (S610 in FIG. 18). The PC 1(k) receives the file (S611 in FIG. 18) and transmits a report telling that the file has been transferred to the server 2 (S612 in FIG. 18). The server 2 receives the completion report (S613 in FIG. 18) and proceeds to step S602.

The embodiment A monitors conditions of the PCs 1 and decides the transfer object of the copy of the file according to a change in the conditions. The embodiment B monitors conditions of the network 30 and decides the transfer object of the copy of the file according to a change in the conditions. The present invention, however, is not limited to the embodiments and the transfer object may be selected according to a change in the number of the PCs 1 which are connected to the network 30 or a change of the service level.

Y Corp. may apply system maintenance to the file system at X Corp. after having X Corp. to operate the system for a certain period of time. Specifically, Y Corp. may make any change to the judgment algorithm of the write object PC 1(j) or the judgment algorithm of the transfer object PC (k) (maintenance step). Y Corp. may also install a program to a new PC 1 or enhance the functions of the server 2 as the number of the PCs 1 included in the intra-network 100 increases.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method performed at least in part at a server in a network file system that includes said server and a plurality of clients connected by a network, the method comprising:
   receiving a data write request from one client;
   selecting a client as a write object of said data from the other clients according to a condition of said one client stored in advance and/or conditions of said other clients; and
   transmitting said data write request to the client selected as a write object.

2. The method according to claim 1, before selecting the client as the write object, further comprising:
   storing an operational achievement of each of said plurality of clients as a condition of each of said clients.

3. The method according to claim 2, wherein
   when storing the operational achievement, operation probability for each client is periodically calculated based on said operational achievement and said operation probability is stored as a condition of each of said clients.

4. The method according to claim 1, wherein
   a plurality of clients are selected as said write object to meet predetermined data multiplicity.

5. The method according to claim 1, further comprising:
   receiving an availability standard for said data from said one client;
   wherein the client is selected as said write object to meet said received availability standard.

6. The method according to claim 1, wherein
   the client is selected as said write object according to a capacity for said data.

7. The method according to claim 1, further comprising:
   storing storage capacity available for each of said plurality of clients as a condition of each of said clients;
   wherein the client is selected as said write object according to the storage capacity available for each client.

8. The method according to claim 1, wherein
   the client is selected as said write object according to an optimal arrangement, wherein the data is a file transferrable across the network file system.

9. The method according to claim 1, wherein
   the client is selected as said write object so as to minimize used storage capacity of said plurality of clients under a condition that availability of said data meets a predetermined availability standard.

10. The method according to claim 1, wherein
    the client is selected as said write object so as to maximize an availability of said data under the condition that the used storage capacity of said plurality of clients meets a predetermined storage capacity available.

11. The method according to claim 1, wherein the method is performed in:
    a first mode for minimizing a used storage capacity of said plurality of clients under the condition that an availability of said data meets a predetermined availability standard; and
    a second mode for maximizing an availability of said data under a condition that a used storage capacity of said plurality of clients meets said predetermined storage capacity available;
    wherein the client is selected as said write object in a third mode which is placed between said first mode and said second mode.

12. The method according to claim 1, further comprising:
    selecting said client as a transfer object of said data according to a change in a condition of said network file system; and
    transmitting said data write request to the client selected as said transfer object.

13. The method according to claim 12, wherein
    said request to write data in said client which is selected as the transfer object is transmitted via the client which is selected as said write object.

14. The method according to claim 12, wherein
    the condition of said network file system includes at least one of a change in the number of clients, a condition of each client, availability standard of said data, and a condition of said network.

15. The method according to claim 12, further comprising:
    monitoring a condition of each of the plurality of clients in which particular data is written, wherein
    selecting the client as the transfer object of said data on the condition that the number of operating times of the client in which said particular data is written is less than a reference number.

16. The method according to claim 12, further comprising:
    monitoring a condition of said network and a condition of each of the plurality of clients in which particular data is written,
    wherein the client is selected as the transfer object of said data from unfailed clients which are connected to said network on the condition that a part of said network which is connected to a client in which particular data is written fails.

17. The method according to claim 12, further comprising:
    monitoring a condition of each of the plurality of clients in which particular data is written,
    wherein the client is selected as the transfer object of said data on the condition that storage capacity available for said client in which particular data is written is less than reference capacity.

18. The method according to claim 12, wherein
    said client is selected as the transfer object of said data based on a load placed on said network when said data is written in the client which is selected as said transfer object.

19. A server in a network file system that includes the server and a plurality of clients connected by a network, the server comprising:
- a first reception mechanism for receiving a data write request from one of said clients;
- a first judgment mechanism for selecting a client as a write object of said data from the other clients according to a condition of said one client stored in advance and/or conditions of said other clients; and
- a first transmission mechanism for transmitting said data write request to the client selected as a write object.

20. The system according to claim 19, wherein
said client comprises one or more units of auxiliary storage; wherein
said first judgment mechanism decides the auxiliary storage as said write object.

21. The system according to claim 19, wherein said network is an intra-network, wherein said clients are computers.

22. The system according to claim 19, wherein
a first network to which said plurality of clients are connected and a second network to which said server is connected belong to different organizations and both of the networks are interconnected networks.

23. The system according to claim 19, wherein
each said client is a personal computer which is switched on and off at the discretion of a user of each personal computer.

24. A computer program product causing a computer to function as a server in a network file system that includes the server and a plurality of clients connected by a network, the computer program product comprising:
- a non-transitory computer usable storage medium having computer usable program code embodied therewith, the computer usable program code comprising:
- computer usable program code configured to receive a data write request from one of said clients;
- computer usable program code configured to select a client as a write object of said data from the other clients according to a condition of said one client stored in advance and/or conditions of said other clients; and
- computer usable program code configured to transmit said data write request to the client selected as a write object; and
- computer usable program code configured to at least one of: send an instruction to the one of the clients to send the data to the client selected as a write object, and receive a report of transfer of the data to the client selected as a write object.

25. A method for using a network system that comprises a plurality of clients connected by a network, the method comprising
installing a server in said network system,
wherein said server comprises:
- a first reception mechanism for receiving a data write request from one of said clients;
- a first judgment mechanism for selecting a client as a write object of said data from the other clients according to a condition of said one client stored in advance and/or conditions of said other clients; and
- a first transmission mechanism for transmitting said data write request to the client selected as a write object.

* * * * *